US009084220B2

(12) United States Patent
Zou

(10) Patent No.: US 9,084,220 B2
(45) Date of Patent: Jul. 14, 2015

(54) METHOD OF PROVIDING ROUTE UPDATE MESSAGES AND PAGING ACCESS TERMINALS

(75) Inventor: Jialin Zou, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1498 days.

(21) Appl. No.: 11/688,495

(22) Filed: Mar. 20, 2007

(65) Prior Publication Data

US 2007/0249329 A1     Oct. 25, 2007

Related U.S. Application Data

(63) Continuation-in-part of application No. 11/409,491, filed on Apr. 21, 2006, now abandoned, and a continuation-in-part of application No. 11/623,446, filed on Jan. 16, 2007, now Pat. No. 8,195,157.

(51) Int. Cl.
*H04W 40/00* (2009.01)
*H04W 60/04* (2009.01)
*H04W 8/06* (2009.01)
*H04W 68/04* (2009.01)

(52) U.S. Cl.
CPC ............. *H04W 60/04* (2013.01); *H04W 8/06* (2013.01); *H04W 68/04* (2013.01)

(58) Field of Classification Search
CPC ....... H04W 60/04; H04W 8/06; H04W 68/04; H04W 64/00; G01C 21/26; G01S 5/02

USPC .............. 455/445, 435, 456, 525, 456.1–458, 455/414.2, 439, 432.1, 435.1; 370/331, 370/401, 310, 329; 340/7.21; 379/220.01
See application file for complete search history.

(56) References Cited

U.S. PATENT DOCUMENTS

| 5,471,393 A * | 11/1995 | Bolger ..................... 701/446 |
| 5,797,097 A * | 8/1998 | Roach et al. ............... 455/456.2 |
| 6,363,255 B1 * | 3/2002 | Kuwahara .................. 455/456.5 |
| 6,411,895 B1 * | 6/2002 | Lau et al. ................... 701/425 |
| 7,020,440 B2 * | 3/2006 | Watanabe et al. .......... 455/67.11 |
| 2001/0018344 A1 * | 8/2001 | Tervo et al. .................. 455/435 |
| 2003/0061351 A1 * | 3/2003 | Prathima et al. ............ 709/226 |
| 2004/0192341 A1 * | 9/2004 | Wang et al. ................. 455/456.1 |

(Continued)

FOREIGN PATENT DOCUMENTS

| GB | EP 1 122 702 A2 | 8/2001 | ........... G08G 1/0967 |
| WO | WO 01/28271 A1 | 4/2001 | ............... H04Q 7/38 |

OTHER PUBLICATIONS

International Search Report and Written Opinion mailed Jul. 31, 2008.

(Continued)

*Primary Examiner* — Mahendra Patel
(74) *Attorney, Agent, or Firm* — Davidson Sheehan LLP

(57) ABSTRACT

The present invention provides a method for providing route update messages and paging access terminals. One embodiment of the method includes storing information indicative of at least one sector. The sector(s) are determined based on geographic information indicative of a route associated with an access terminal. Another embodiment of the method includes providing information indicative of a route associated with an access terminal. The provided information is used to determine at least one sector associated with the route.

28 Claims, 9 Drawing Sheets

(56) References Cited

U.S. PATENT DOCUMENTS

| | | | | |
|---|---|---|---|---|
| 2004/0203770 | A1* | 10/2004 | Chen et al. | 455/435.1 |
| 2004/0203861 | A1* | 10/2004 | Sahinoglu | 455/456.1 |
| 2006/0079244 | A1* | 4/2006 | Posner et al. | 455/456.1 |
| 2006/0253251 | A1* | 11/2006 | Puranik et al. | 701/211 |
| 2007/0149208 | A1* | 6/2007 | Syrbe et al. | 455/456.1 |
| 2007/0225902 | A1* | 9/2007 | Gretton et al. | 701/202 |
| 2008/0207227 | A1* | 8/2008 | Ren et al. | 455/458 |

OTHER PUBLICATIONS

Kyamakya et al., "*Location Management in Cellular Networks: Classification of the Most Important Paradigms, Realistic Simulation Framework, and Relative Performance Analysis*", IEEE Transactions on Vehicular Technology, vol. 54, No. 2, Mar. 2005.

Madhavapeddy et al., *Adaptive Paging Algorithms for Cellular Systems*, IEEE 1995 pp. 976-980.

\* cited by examiner

METHOD OF PROVIDING ROUTE UPDATE MESSAGES AND PAGING ACCESS TERMINALS

CROSS REFERENCE TO RELATED APPLICATIONS

This application is a continuation-in-part of U.S. patent application Ser. No. 11/409,491 filed on Apr. 21, 2006 and U.S. patent application Ser. No. 11/623,446, filed on Jan. 16, 2007 which are hereby incorporated herein by reference in their entirety.

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of cells, which may be grouped into one or more networks. Access terminals located in each cell may access the wireless communications system by establishing a wireless communication link, often referred to as an air interface, with a base station associated with the cell. The access terminals may include devices such as mobile telephones, personal data assistants, smart phones, Global Positioning System devices, wireless network interface cards, desktop or laptop computers, and the like. As an access terminal moves between cells in the wireless communication system, the access terminal may periodically provide route update messages (also known as location update messages) that inform the wireless communication system of the access terminal's current location. Due to the mobility of the access terminal, the location of the cell where the most recent route update message was received is used to estimate the current location of the access terminal.

In some activity states, such as the idle or dormant mode or when the access terminal has been powered down, the access terminal may stop sending route update messages even though it may continue to move through the cells in the wireless communication system, until some condition is met (e.g., when the access terminal crosses the boundary of the sub-net associated with the last route update message, a new location update with the new sub-net is sent). Accordingly, the wireless communication system may not know which cell contains the access terminal when information becomes available for delivery to the access terminal. A wireless communication system may then attempt to reach the access terminal by sending paging messages over a plurality of cells belonging to a paging area determined by the network based on the information it has about the last known access terminal location, e.g., over the cells belonging to the last known sub-net. The paging messages contain information that indicates to the access terminal that information is available for transmission to the access terminal. If the access terminal receives the paging message, it may provide a paging response to a base station of a cell. The paging response typically indicates that the access terminal is available to receive the information and may also provide information indicating how to route the information to the access terminal.

Both the paging messages and the route update (or registration) messages represent system overhead. Accordingly, the wireless communication system is generally designed to meet two conflicting objectives: reducing the overhead from the paging load and reducing the number of route update messages transmitted by the access terminal. The paging load is typically minimized when the location of the access terminal is known with relatively high accuracy so that each paging message can be transmitted to a relatively smaller number of cells. However, increasing the accuracy of the location of the access terminal requires transmitting a larger number of route update messages during a given period. In contrast, reducing the number of route update messages transmitted by the access terminal may reduce the accuracy of the access terminal location estimation by the wireless communication system, which typically results in each paging message being transmitted to a relatively large number of cells.

The conventional solution to this problem is to define subnets that include the cells serviced by a plurality of base stations. The access terminals may then transmit route update messages when they cross from one sub-net to another sub-net and the wireless communication system may begin the paging process by providing paging messages via the base stations in the sub-net indicated by the most recently received route update message. For example, the geographic area served by the wireless communication system may be divided up into multiple sub-nets that encompass the cells serviced by groups of 50 base stations. Access terminals in the wireless communication system may then provide location updates when they cross a cell boundary between the groups of 50 base stations and the wireless communication system may provide paging messages via the groups of 50 base stations in the sub-nets.

However, the number of users and the geographical area served by wireless communication systems is increasing, which results in an increase in the size and number of cells in a typical sub-net. Since conventional route update messages are triggered by crossing a sub-net boundary, access terminals may travel through numerous cells without providing any route update messages to the wireless communication system. Consequently, the wireless communication system may be required to provide paging messages to a large (and likely increasing) number of cells in order to locate the access terminal. The wireless communication system may therefore have to devote a larger percentage of system resources to supporting overhead associated with providing paging messages to large numbers of cells in the sub-nets.

One technique for reducing the number of cells that are paged is called radius-based paging. Radius-based paging techniques force the access terminal to provide a route update message when it travels a distance larger than a predetermined radius from a center of the cell where the access terminal was last seen. Alternatively, the access terminal may provide a route update message when it travels a distance larger than a predetermined radius from a group of cells covered by a radio network controller associated with the access terminal. The wireless communication system may then page the access terminal by providing a paging message to the cell where the access terminal was last seen. If the access terminal does not respond to this paging message, the wireless communication system may page the cells in the area defined by the predetermined radius. Paging messages may be provided to cells in increasingly large areas (indicated by increasingly large radii) if the access terminal fails to reply to a previous paging message.

Although radius-based paging may be preferable to subnet-based paging when the subnets include a large number of cells, radius-based paging still has a number of drawbacks. The system overhead associated with providing paging messages to all of the cells within the predetermined radius may consume a large percentage of the resources of the wireless communication system. The number of cells within a predetermined radius may be reduced by decreasing the radius, but this will result in an increase in the frequency of transmitting route update messages by the access terminal. Consequently, the system overhead associated with providing the route update messages may increase and consume a larger percentage of the resources of the wireless communication system. Power consumption by the access terminal may also be increased when the number of route update messages increases. Furthermore, relatively long paging delays may be experienced as the wireless communication system attempts to locate the access terminal in cells at increasing distances from the cell where the access terminal was last seen.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In embodiments of the present invention, a method is provided for providing route update messages and paging access terminals. One embodiment of the method includes storing information indicative of at least one sector. The sector(s) are determined based on geographic information indicative of a route associated with an access terminal. Another embodiment of the method includes providing information indicative of a route associated with an access terminal. The provided information is used to determine at least one sector associated with the route.

BRIEF DESCRIPTION OF THE DRAWINGS

The invention may be understood by reference to the following description taken in conjunction with the accompanying drawings, in which like reference numerals identify like elements, and in which.

Figure 1:
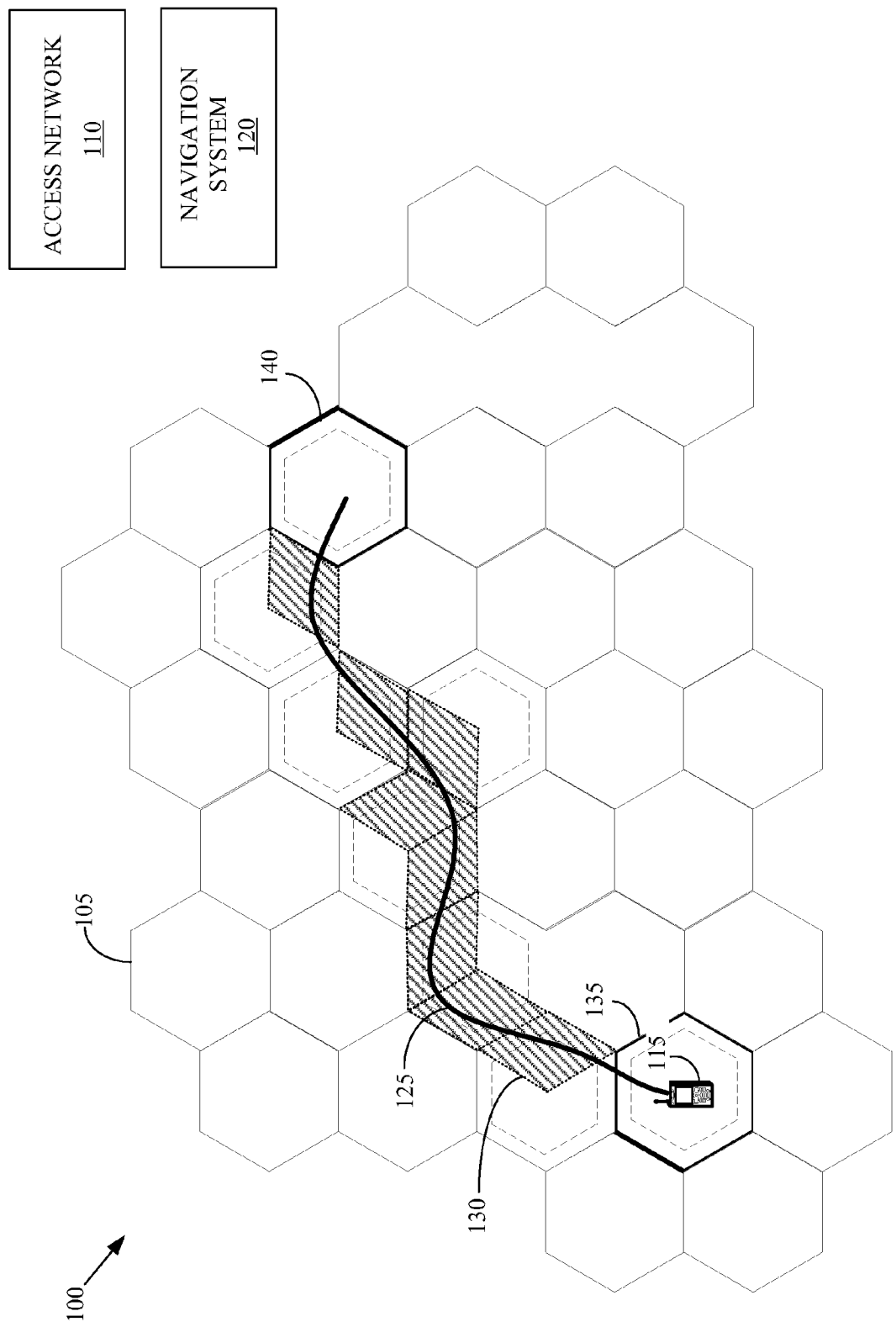
FIG. 1 conceptually illustrates a first exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the first exemplary embodiment, the wireless communication system 100 is configured to provide wireless connectivity to a plurality of geographic areas or cells 105 (only one specifically indicated by the numeral 105). Each cell 105 may include one or more sectors. The wireless connectivity may be provided according to one or more standards or protocols such as the Universal Mobile Telecommunication System (UMTS), the Global System for Mobile communications (GSM), Code Division Multiple Access (CDMA, CDMA 2000), Worldwide Interoperability for Microwave Access (WiMAX), Ultra Mobile Broadband (UMB), Long Term Evolution (LTE) and the like. However, the particular standards, protocols, or combinations thereof are matters of design choice and not material to the present invention. One or more access networks 110 may be deployed within the wireless communication system 100. Although a single access network 110 is shown in FIG. 1, persons of ordinary skill in the art having benefit of the present disclosure should appreciate that any number of access networks may be deployed in the wireless communication system 100. Persons of ordinary skill in the art should also appreciate that the present invention is not limited to wireless communication systems that include access networks 110. In alternative embodiments, the wireless communication system 100 may include other devices (such as radio network controllers, base stations, base station routers, and the like) for connecting the cells to the wireless communication system 100. Techniques for configuring and/or operating the access networks 110 are known in the art and in the interest of clarity only those aspects of configuring and/or operating the access network 110 that are relevant to the present invention will be discussed further herein.

An access terminal 115 is deployed within the wireless communication system 100, which may provide wireless connectivity to the access terminal 115. Although a single access terminal 115 is shown in FIG. 1, persons of ordinary skill in the art having benefit of the present disclosure should appreciate that any number of access terminals 115 may be deployed in the wireless communication system 100. Persons of ordinary skill in the art should also appreciate that the access terminal 115 may also be referred to using terms such as "mobile unit," "mobile station," "user equipment," "subscriber station," "subscriber terminal," and the like. Exemplary access terminals 115 include, but are not limited to, cellular telephones, personal data assistants, smart phones, pagers, text messaging devices, global positioning devices, network interface cards, notebook computers, and desktop computers. Persons of ordinary skill in the art should also appreciate that portability is not necessarily a requirement for mobility. Techniques for configuring and/or operating the access terminal 115 are known in the art and in the interest of clarity only those aspects of configuring and/or operating the access terminal 115 that are relevant to the present invention will be discussed further herein.

The wireless communication system 100 also includes a navigation system 120. In one embodiment, the navigation system 120 may be incorporated into the access terminal 115. However, the present invention is not limited to navigation systems 120 that are incorporated into access terminals 115. In alternative embodiments, the navigation system 120 may be incorporated into the access network 110 and/or may be a third party device that is not implemented in either the access terminal 115 or the access network 110. For example, the navigation system 120 may be a third party device that is provided with a rental car operated by a user of the access terminal 115. Persons of ordinary skill in the art having benefit of the present disclosure should appreciate that the navigation system 120 may be implemented in hardware, firmware, software, or any combination thereof. Techniques for communicating information between the navigation system 120 and the access network 110 and/or the access terminal 115 may be implemented by persons of ordinary skill in the art having benefit of the present disclosure. For example, when the navigation system 120 is a third party device, the access terminal 115 may be able to communicate with the navigation system 120 over a Bluetooth interface or some other wired and/or wireless connection.

The navigation system 120 is configured to determine geographic information indicative of a route 125 between two locations. One exemplary embodiment of a navigation system 120 utilizes global positioning system (GPS) information to determine a route 125 that may be traveled by the access terminal 115 from a first location to a second location. For example, a user of the access terminal 115 may input a destination address that may be transmitted to the navigation system 120, which may use GPS information to determine the current location of the access terminal 115. The navigation system 120 may then use the current location, the destination address, and mapping information (such as geographic information systems (GIS) information) to determine an optimal route 125 from the current location to the destination address. Techniques for implementing and/or operating the navigation system 120 are known in the art and in the interest of clarity only those aspects of implementing and/or operating the navigation system 120 that are relevant to the present invention will be discussed herein. Information indicative of the route 125 may then be provided to the access terminal 115 and/or the access network 110.

Figure 2:
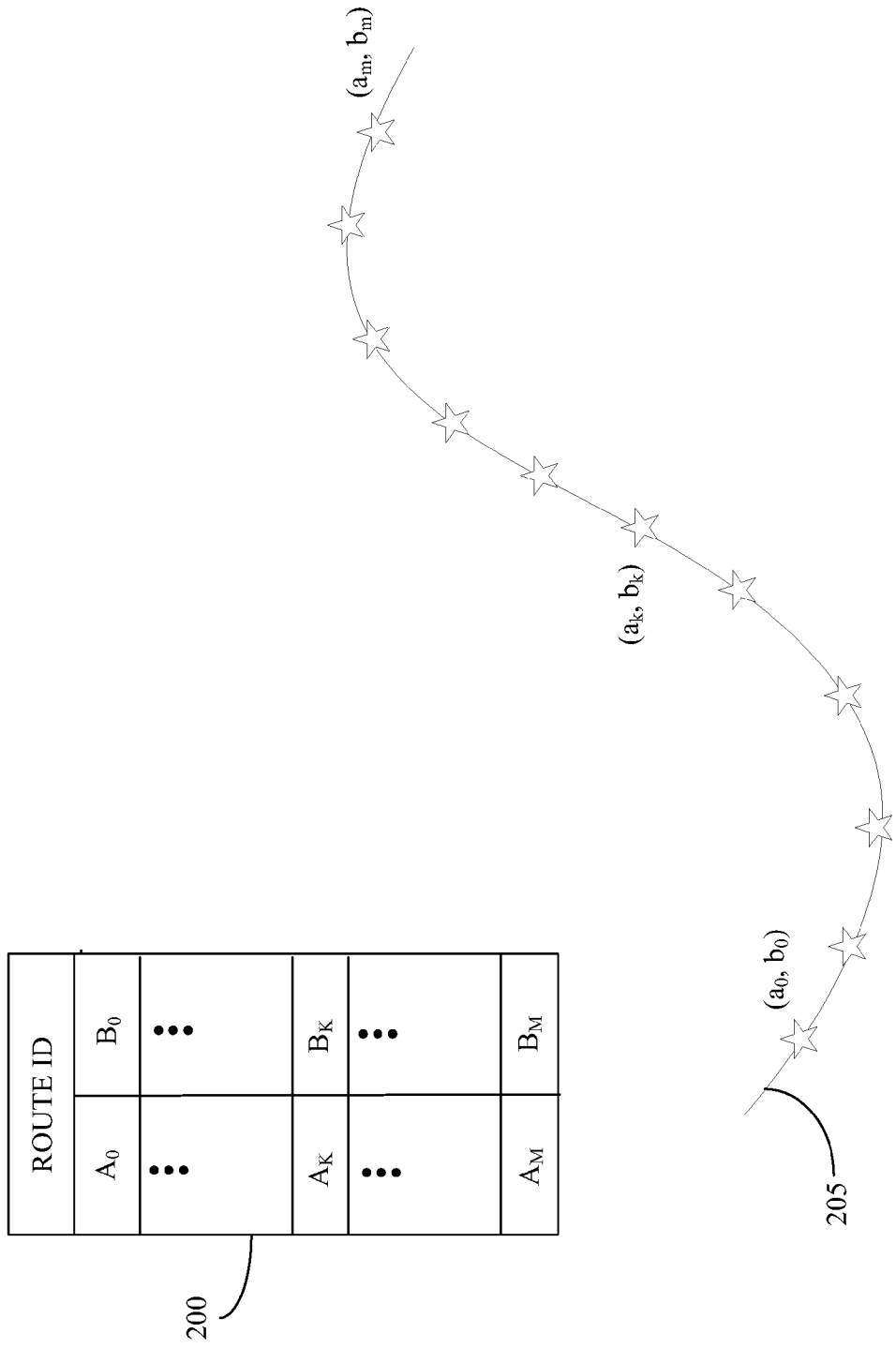
FIG. 2 conceptually illustrates one exemplary embodiment of a route report that may be formed based on a route determined by a navigation system, in accordance with the present invention.

FIG. 2 conceptually illustrates one exemplary embodiment of a route report 200 that may be formed based on a route 205 determined by a navigation system. In the illustrated embodiment, the report 200 includes information indicating a route identifier (ROUTE ID) and pairs of coordinates (a, b) that indicate geographic locations along the route. The coordinates may be pairs of latitudes and longitudes or any other coordinates determined by any other coordinates system. The resolution of the coordinate pairs is a matter of design choice and may be determined ahead of time based upon requirements of the wireless communication system. Alternatively, the resolution of the coordinate pairs may be determined dynamically at the time the route report 200 and/or the route 205 are determined. The route report 200 may then be provided to the access terminal 115 and/or the access network 110.

Referring back to FIG. 1, one or more travel patterns may be determined based on the information indicative of the route 125. As used herein, the term "travel pattern" will be understood to refer to one or more cells 105 or sectors 130 within the cells that are likely to be visited by the access terminal 115. In one embodiment, the cells and/or sectors 130 in the travel pattern may be selected based upon the geographic information that is provided by the navigation system 120. However, persons of ordinary skill in the art having benefit of the present disclosure should appreciate that travel patterns may also be determined using other techniques. For example, travel patterns may be determined based upon statistical information associated with the access terminal 115, such as statistical information indicating the cells 105 and/or sectors 130 that are commonly visited by the access terminal 115. In this case, the statistical information may be collected during one or more previous trips or journeys taken by the access terminal 115.

In the illustrated embodiment, the travel pattern includes cells 105 and/or sectors 130 that are likely to be visited by the access terminal 115 after leaving a primary cell 135 (e.g., the cell that provides wireless connectivity to the access terminal 115 when it is located in the user's home, workplace, or other location where the user may spend a large fraction of time) and before arriving at a destination location within a destination cell 140. For example, a particular user may decide to go to a new restaurant for dinner and may input the address of the restaurant into the navigation system 120, which may compute the route 125 from the user's current location in the primary cell 135 to the destination address in the destination cell 140. Geographic information indicative of the determined route, such as a route report, may then be used to determine the cells 105 (indicated by dashed hexagons) and/or sectors 130 (indicated by hatching) that lie along the route 125. The determined travel patterns may be stored in the access terminal 115 and/or the access network 110. Techniques for determining the cells 105 and/or sectors 130 that are included in the travel patterns will be discussed in more detail below.

The access terminal 115 may determine whether or not to provide a route update message based on the travel patterns. As used herein, the term "route update message" will be understood to refer to any message that includes information that may be used to determine a location of the access terminal 115. In one embodiment, the access terminal 115 may not provide route update messages as long as it remains within one of the cells 105 and/or sectors 130 in a travel pattern associated with the route 125. For example, the access terminal 115 may conventionally provide a route update message whenever it moves outside a predetermined radius from the center of the primary cell 135. However, as long as the access terminal 115 remains in one of the cells 105 and/or sectors 130 in the travel pattern associated with the route 125, the access terminal 115 may not provide any route update messages. If the access terminal 115 enters a cell 105 and/or sector 130 that is not in the travel pattern associated with the route 125, the access terminal 115 may then provide a route update message to the access network 110.

The access terminal 115 may be paged using information indicative of the travel patterns. In one embodiment, a database including the cells in the travel patterns associated with each access terminal 115 is stored in the access network 110. For example, the database may be formed using information provided by the access terminal 115 when it determines one or more of the travel patterns. The access terminal 115 may also provide information indicating that it is currently traveling along a route 125 that may be associated with the travel patterns associated with the route 125 determined by the navigation system 120. For example, the access terminal 115 may send a message, such as a route update message, that includes an identification number indicating the travel pattern determined based on the route 125 by the navigation system 120. The access network 110 may then use the information indicative of the current travel pattern associated with the access terminal 115 to send a paging message via the cells 105 and/or sectors 130 in the travel pattern.

Figures 3A, 3B:
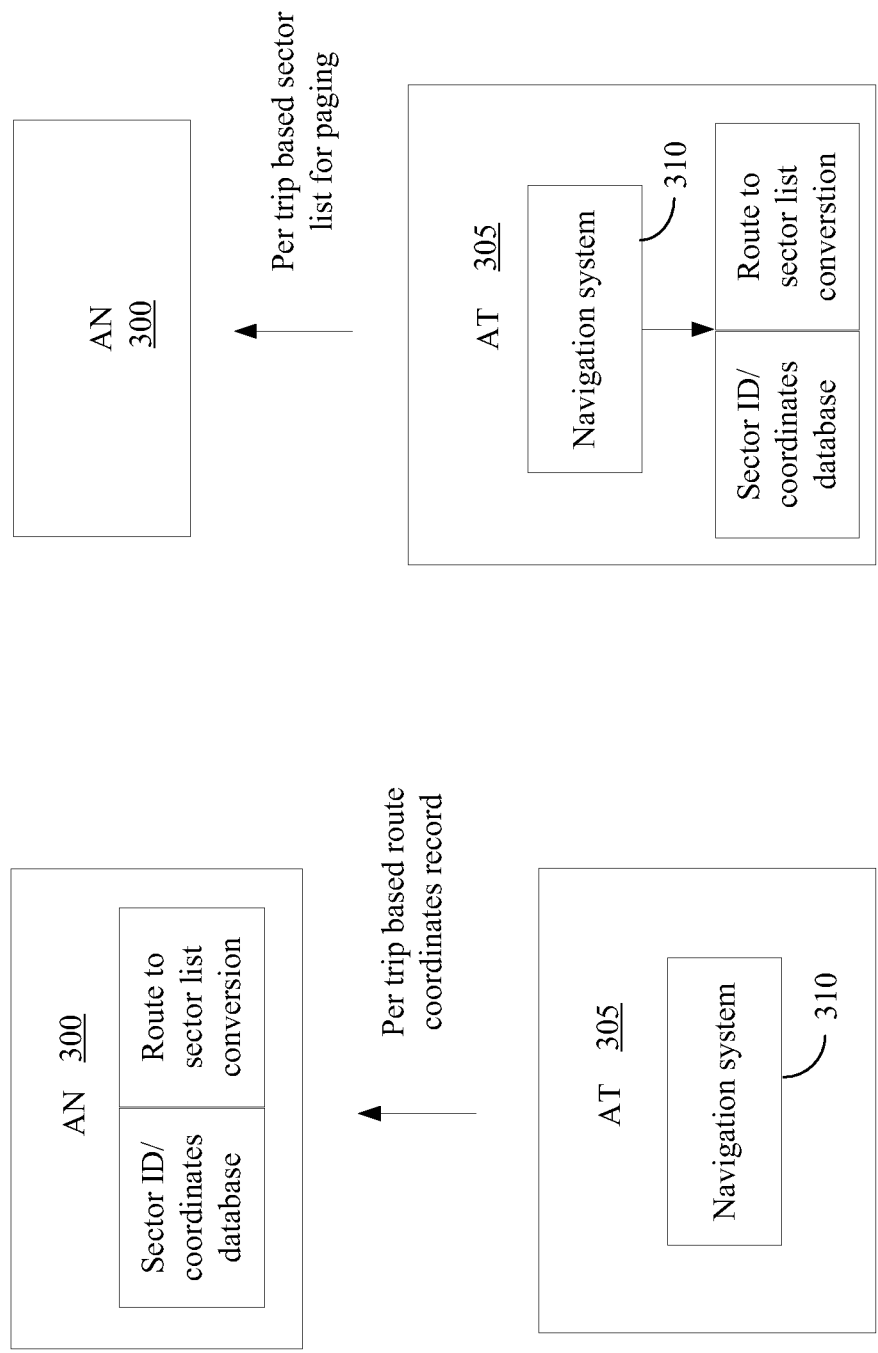
FIGS. 3A and 3B conceptually illustrate alternative embodiments of an access network and an access terminal, in accordance with the present invention.

FIGS. 3A and 3B conceptually illustrate alternative embodiments of an access network 300 and an access terminal 305. However, these embodiments are intended to be illustrative and not to limit the present invention. In particular, the embodiments of the access network 300 and the access terminal 305 shown in FIGS. 3A and 3B both depict a navigation system 310 that is incorporated into the access terminal 305. However, as discussed above, the navigation system 310 does not need to be incorporated in the access terminal 305.

In the embodiment shown in FIG. 3A, the access terminal 305 includes a navigation system 310 that may be used to determine routes between two locations, such as a current location of the access terminal 305 and a destination location. For example, a user of the access terminal 305 may input a destination address so that the navigation system 310 can compute a route from the current location of the access terminal 305 to the destination address. Once the navigation system 310 has computed the route, this information may be provided to the access terminal 305, which may forward this information to the access network 300 over an air interface between the access terminal 305 and the access network 300. The conversion of the information indicative of the route determined by the navigation system 310 to a list of cells and/or sectors associated with the route may then be performed by the access network 305. Persons of ordinary skill in the art having benefit of the present disclosure should appreciate that this conversion may be performed using hardware, firmware, software, or any combination thereof. The cell and/or sector list associated with the route of the access terminal 305 may then be stored in a database, which may be located in the access network 305 and/or at a remote location within the wireless communication system.

In the embodiment shown in FIG. 3B, the access terminal 305 includes a navigation system 310 that may be used to determine route, as discussed above. However, in this embodiment, the access terminal 305 may perform conversion of the route information to the cell and/or sector list. Thus, once the navigation system 310 has computed the route, this information may be provided to the access terminal 305, which may convert the information indicative of the route determined by the navigation system 310 to a list of cells and/or sectors associated with the route. Persons of ordinary skill in the art having benefit of the present disclosure should appreciate that this conversion may be performed using hardware, firmware, software, or any combination thereof. The cell and/or sector list associated with the route of the access terminal 305 may then be stored in a database located in the access terminal 305. The access terminal 305 may provide the cell and/or sector list to the access network 300 on a per-trip basis, so that the access network 300 does not need to compute and/or store cell and/or sector lists associated with all of the potential trips associated with the access terminal 305. For example, the access terminal 305 may provide the cell and/or sector list associated with a route in response to leaving a primary cell and entering one or more of the cells and/or sectors associated with the route.

Figure 4:
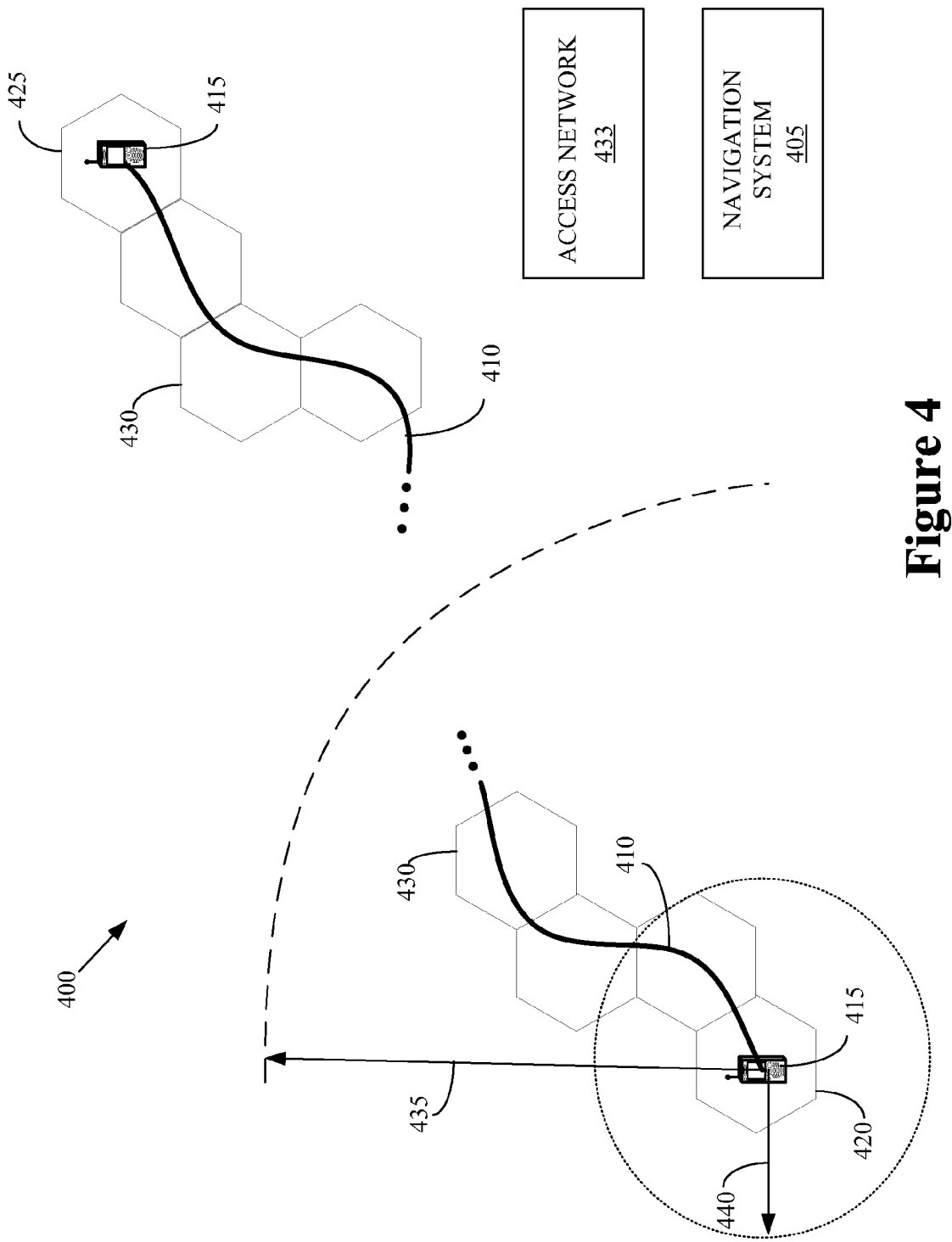
FIG. 4 conceptually illustrates a second exemplary embodiment of a wireless communication system, in accordance with the present invention.

FIG. 4 conceptually illustrates a second exemplary embodiment of a wireless communication system 400. In the illustrated embodiment, a navigation system 405 as determined the cell and/or sector list (e.g., a travel pattern) associated with a route 410 that may be traveled by an access terminal 415 from a location within a primary cell 420 to a location in a destination cell 425. The cell and/or sector list includes information indicative of cells and/or sectors 430 that lie along the route 410. When the user leaves the primary cell 420 and enters one of the cells 430 associated with the travel pattern for the route 410, the access terminal 415 may determine that the cell 430 is associated with the travel pattern. The access terminal 415 may provide a route update message in response to leaving the primary cell 420. Information included in the route update message may indicate to the wireless communication system 400 that the access terminal 420 is most likely to be found in cells 430 associated with the travel pattern. If information destined for the access terminal 415 is received by the wireless communication system 400, then an access network 433 may transmit a paging message via the cells 430 in the travel pattern.

In some cases, the number of cells 430 in the travel pattern may be large. For example, the user may travel a relatively long distance through densely populated areas and so may pass through a relatively large number of cells 430 when traveling between the primary cell 420 and the destination cell 425. Thus, in some embodiments, the access terminal 415 may also use a distance traveled from one or more of the cells 430 to trigger transmission of a route update message. For example, the access terminal 415 may transmit the route update message when it has traveled a distance greater than the radius 435 from the primary cell 420, even though the access terminal 415 may still be traveling in cells 430 associated with the travel pattern. In one embodiment, the radius 435 may be selected to be larger than a radius 440 that is used for radius-based paging techniques when the access terminal 415 is not traveling along a known travel pattern. Persons of ordinary skill in the art having benefit of the present disclosure should appreciate that the particular values of the radii 435, 440 are matters of design choice and not material to the present invention.

Figure 5A:
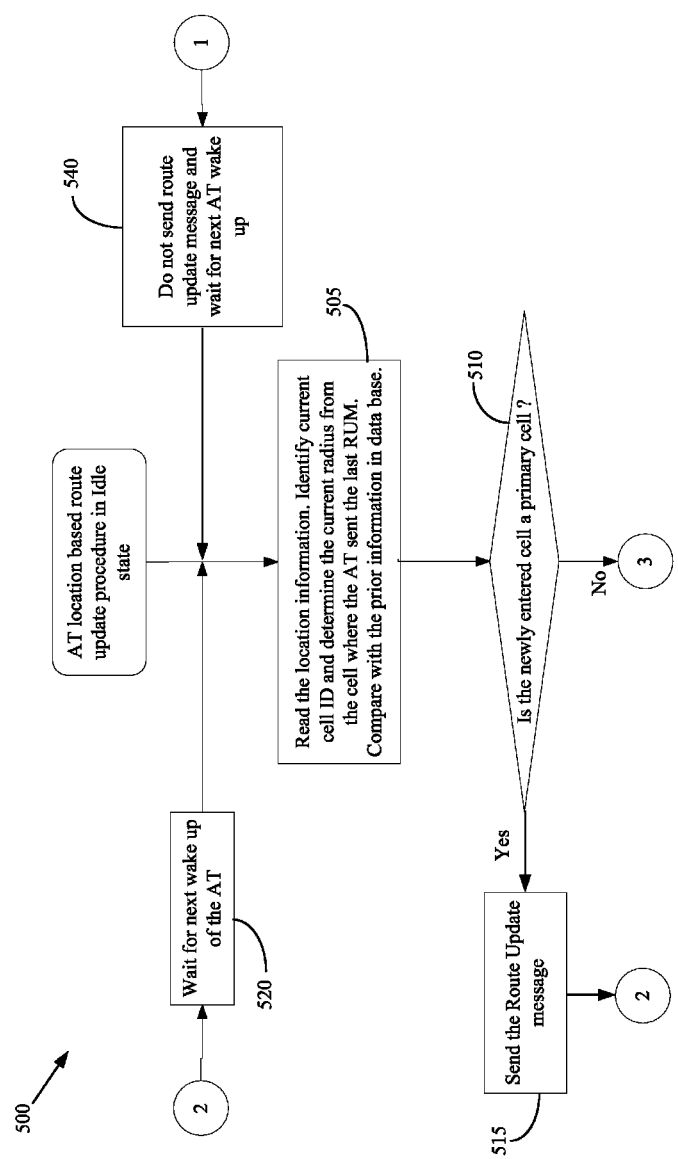
FIGS. 5A and 5B illustrate portions of one exemplary method of providing route update messages, in accordance with the present invention.
Figure 5B:
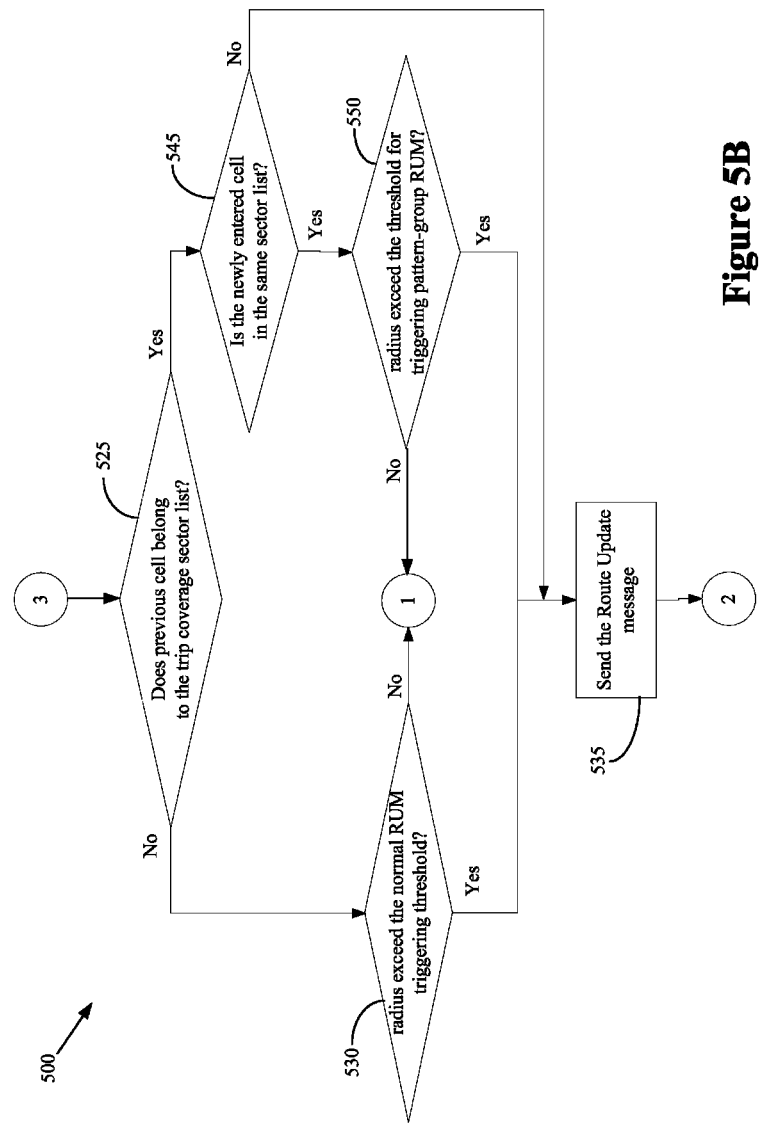

FIGS. 5A and 5B illustrate portions of one exemplary method 500 of providing route update messages. In the illustrated embodiment, the access terminal is in the idle state. The access terminal may read (at 505) location information and use this information to identify the current cell and/or sector. The access terminal may also determine (at 505) the distance or radius from the current cell to the cell and/or sector that provided wireless connectivity to the access terminal when the access terminal last sent a route update message to the wireless communication system. If the newly entered cell is determined (at 510) to be a primary cell, then the access terminal may send (at 515) a route update message and wait (at 520) for the next time the access terminal wakes up. If the newly entered cell is determined (at 510) not to be a primary cell, then the access terminal may determine (at 525) whether or not the previous cell belonged to the trip coverage cell and/or sector list.

If the previous cell does not belong to the trip coverage cell and/or sector list and the determined radius exceeds (at 530) the normal radius for triggering a route update message, then the access terminal may send (at 535) a route update message and wait (at 520) for the next time the access terminal wakes up. If the previous cell does not belong to the trip coverage cell and/or sector list and the determined radius does not exceed (at 530) the normal radius for triggering a route update message, then the access terminal may not send a route update message and may wait (at 540) for the next time the access terminal wakes up.

If the access terminal determines (at 525) that the previous cell belongs to the trip coverage cell and/or sector list and also determines (at 545) that the newly entered cell is not in the same sector list as the trip coverage cell and/or sector list, then the access terminal may send (at 535) a route update message and wait (at 520) for the next time the access terminal wakes up. If the access terminal determines (at 525) that the previous cell belongs to the trip coverage cell and/or sector list and also determines (at 545) that the newly entered cell is in the trip coverage cell and/or sector list, then the access terminal may determine (at 550) whether the radius from the previous cell to the current cell exceeds a threshold for triggering a pattern-group route update message. In one embodiment, the threshold for triggering the pattern-group route update message may exceed the normal route update message for triggering threshold, as discussed herein.

If the radius exceeds the threshold for triggering the pattern-group route update message, then the access terminal may send (at 535) a route update message and wait (at 520) for the next time the access terminal wakes up. If the radius does not exceed the threshold for triggering the pattern-group route update message, then the access terminal may not send a route update message and may wait (at 540) for the next time the access terminal wakes up.

Figure 6:
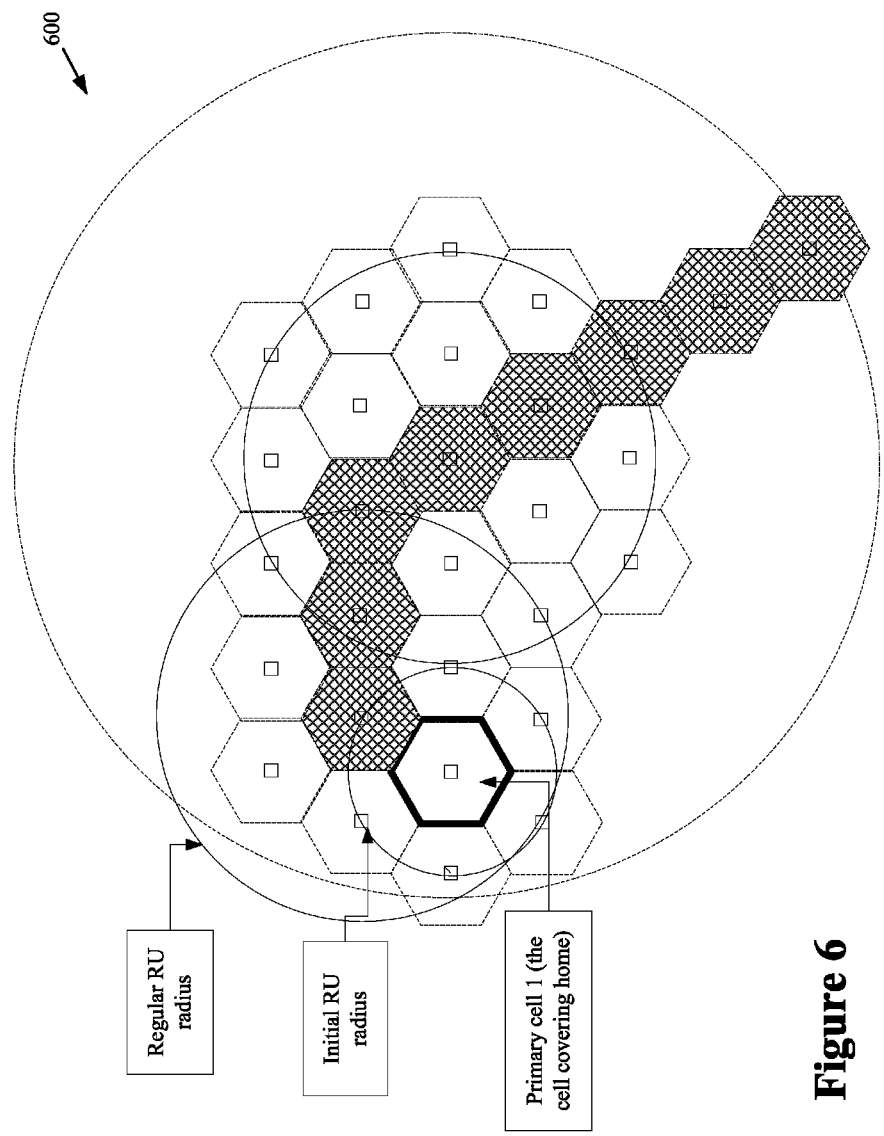
FIG. 6 conceptually illustrates a third exemplary embodiment of a wireless communication system, in accordance with the present invention.

FIG. 6 conceptually illustrate a third exemplary embodiment of a wireless communication system 600. The third exemplary embodiment of the wireless communication system 600 illustrates some potential advantages (relative to conventional radius-based paging) of sending route update messages and/or paging access terminal based on a travel pattern associated with a route traveled by the access terminal. In the third exemplary embodiment, the cell and/or sector list includes a primary cell (boldface hexagon) and a plurality of cells (indicated by crosshatching) along a route determined by a navigation system. A first route update message will be provided by the access terminal when it leaves the primary cell or crosses outside the initial route update radius. In some cases, such as when an access terminal leaves the primary cell while traveling along a travel route suggested by the navigation system, the first route update message may be triggered in the conventional manner. Alternatively, the first route update may be triggered when the access terminal travels a predetermined radius from its starting point, regardless of whether or not the access terminal is traveling along a statistically-determined travel route pattern. In one embodiment, the predetermined radius may be much smaller than the conventional triggering radius, the radius for the statistics based travel route pattern, and/or the navigation system determined travel route. If the wireless communication system 600 needs to contact the access terminal following this initial route update message, then only three cells in the travel pattern are within the regular route update radius and therefore need to be paged.

If the access terminal continues to travel along the travel pattern and passes outside of the first regular route update radius, it will provide another route update message. If the wireless communication system 600 needs to contact the access terminal following this route update message, then only the five cells in the travel pattern that are within the regular route update radius need to be paged. If conventional radius-based paging was being used then the wireless communication system 600 would be to provide paging messages via 19 different cells. Even if the route update radius was doubled (as indicated by the dashed circle), transmitting paging messages only to cells within the travel pattern still requires transmitting paging messages to only nine cells, which is still only half of the 19 cells that would need to be paged if conventional radius-based paging was used with the smaller route update radius. Consequently, implementing route update messaging and/or paging based upon the travel pattern can reduce the route update frequency and also reduce the number of cells that need to be paged.

Figure 7:
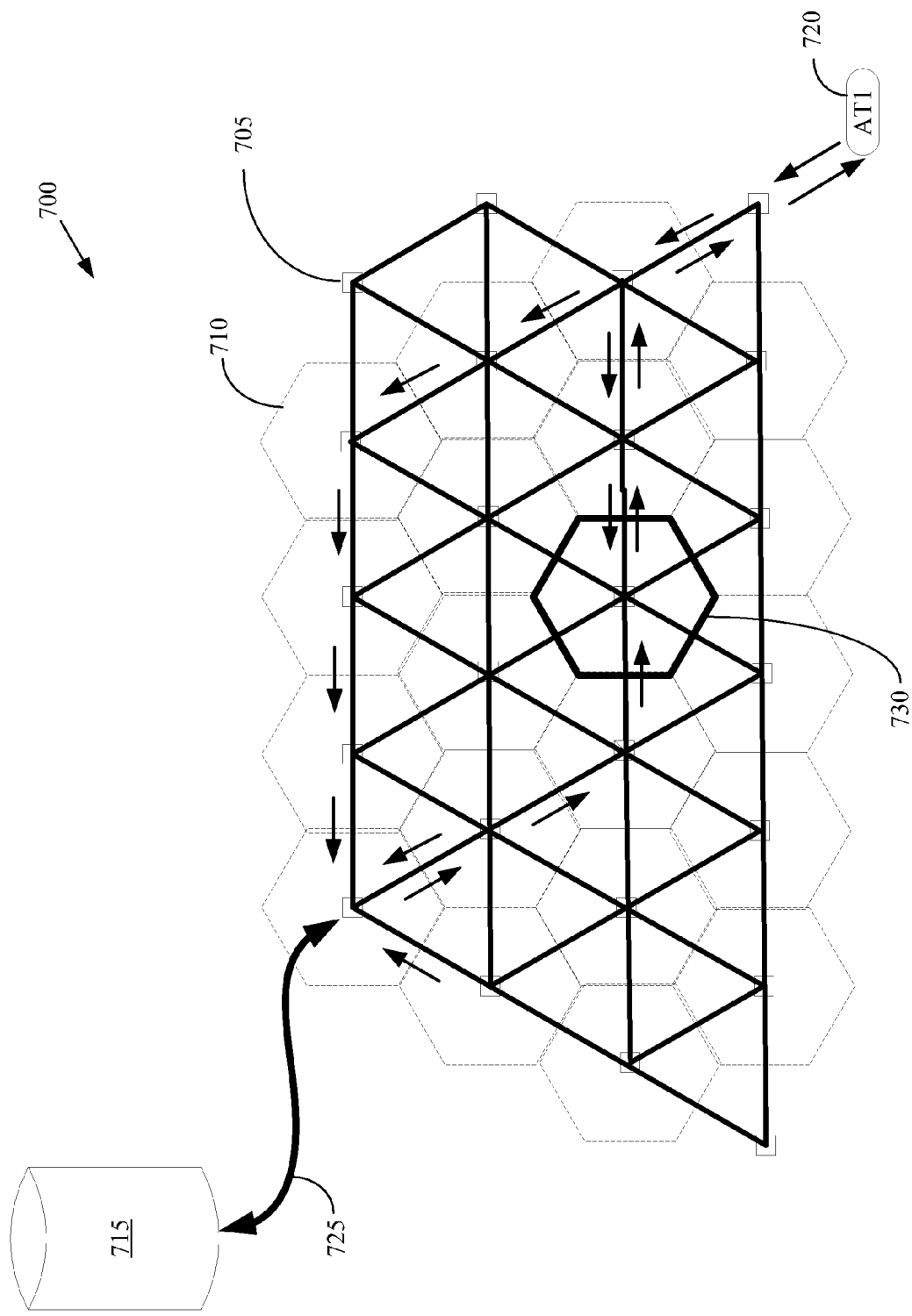
FIG. 7 conceptually illustrates a fourth exemplary embodiment of a wireless communication system, in accordance with the present invention.

FIG. 7 conceptually illustrates a fourth exemplary embodiment of a wireless communication system 700. In the illustrated embodiment, the wireless communication system 700 is a wireless communication system 700 with flat network architecture that includes a plurality of base station routers 705 to provide wireless connectivity to a corresponding plurality of cells 710. The base station routers 705 are interconnected as indicated by the lines connecting the base station routers 705. The lines may indicate one or more wired and/or wireless connections that may be used to transmit information between the base station routers 705. The fourth exemplary embodiment of the wireless communication system 700 also includes a centralized database 715 that is used to store location statistics for access terminals 720 operating in the wireless communication system 700. For example, the centralized database 715 may include information indicative of travel patterns associated with the access terminal 720. The centralized database 715 is coupled to the network of base station routers 705 by a wired and/or wireless backhaul link 725.

In the illustrated embodiment, base station router 730 is the session control base station router 730 for the access terminal 720. Accordingly, the base station router 730 may store session information associated with the access terminal 720. However, the access terminal 720 shown in FIG. 7 entered the sleep mode at some point and has roamed to a different cell 710 associated with a different base station router 705. If the access terminal 720 wakes up and determines that it is necessary to provide a route update message, then this information is transmitted over the links between base station routers 705 to the session control base station router 730, as indicated by the arrows flowing away from the access terminal 720. The route update message is also transmitted over the links between base station routers 715 and the backhaul link 725 to the centralized database 715. Similarly, paging messages provided by the wireless communication system 700 may also require access to information stored in a centralized database 715, as indicated by the arrows flowing away from the database 715. Thus, route update messages and/or paging messages associated with the access terminals 720 in the wireless communication system 700 may lead to a relatively large amount of traffic throughout the network of base station routers 730 and/or over the backhaul link 725 to the centralized database 715. Therefore, the approach with a centralized paging database is more suitable for a hierarchical network. In the hierarchical network, the centralized database could reside at a place such as a RNC which connects every basestation in the area that it covers.

Figure 8:
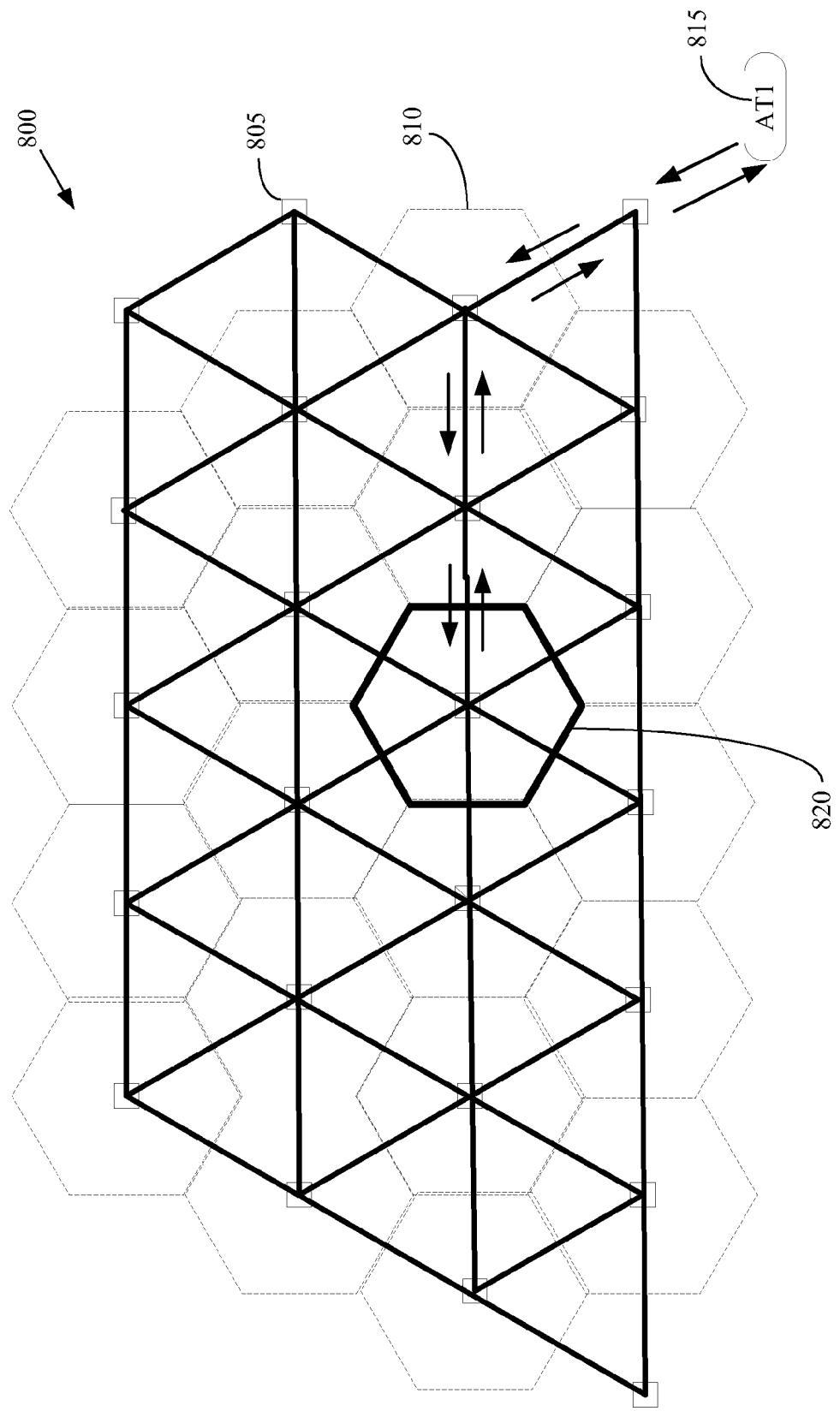
FIG. 8 conceptually illustrates a fifth exemplary embodiment of a wireless communication system, in accordance with the present invention.

FIG. 8 conceptually illustrates a fifth exemplary embodiment of a wireless communication system 800. Like the fourth exemplary embodiment, the wireless communication system 800 is a wireless communication system 800 with flat network architecture that includes a plurality of interconnected base station routers 805 to provide wireless connectivity to a corresponding plurality of cells 810. However, the fifth exemplary embodiment of the wireless communication system 800 differs from the fourth exemplary embodiment in that the fifth exemplary embodiment of the wireless communication system 800 and does not include a centralized database. Instead, the per-user-based location statistics are associated with the session information for each access terminal 815. Accordingly, travel patterns associated with the access terminal 815 may be stored in the base station router 820 where the session and the paging controller of the access terminal reside. The base station route 820 maybe called the "anchor" or the "session controller" of the access terminal. Any base station route could hold the session and the paging controller of an access terminal and become an "anchor" base station router of the access terminal. The information indicative of the travel patterns associated with the access terminal 815 may be migrated along with other session information when a session associated with the access terminal 815 is handed off to another base station router 805.

In the fifth exemplary embodiment, the access terminal 815 determines the cell and/or sector lists associated with travel patterns. This information may be uploaded to the session control base station router 820 at initial session registration or in response to a user entering the destination address and receiving route information from a navigation system. If the access terminal 815 determines that it is necessary to provide a route update message, then this information is transmitted over the links between base station routers 805 to the session control base station router 820, as indicated by the arrows flowing away from the access terminal 815. Paging messages destined for the access terminal 815 may be provided by the session control base station router 820 via the links between other base station routers 805, as indicated by the arrows flowing out from the session control base station router 820. Thus, route update messages and/or paging messages associated with the access terminals 815 in the wireless communication system 800 may generate less traffic (relative to systems such as the fourth exemplary embodiment shown in FIG. 7) throughout the network of base station routers 805 and/or over the backhaul links in the wireless communication system 800.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A method, comprising:
   receiving, at a base station router from an access terminal, a route update message including session information indicating a travel pattern that includes at least one sector, said at least one sector being determined based on geographic locations along a route from a current location of the access terminal to a destination location, and wherein the route is determined in response to the destination location being input to the access terminal to request computation of the route;
   storing the session information at the base station router, wherein the session information can migrate between base station routers; and
   paging the access terminal in said at least one sector.

2. The method of claim 1, wherein the access terminal is configured to access the geographic locations and to determine the travel pattern comprising said at least one sector based on the accessed geographic locations, wherein the travel pattern indicates sectors that are likely to be visited by the access terminal after leaving the current location and before arriving at the destination location.

3. The method of claim 2, comprising providing information indicative of a plurality of sectors to the access terminal such that the access terminal can select said at least one sector from the plurality of sectors.

4. The method of claim 2, wherein receiving the session information indicative of said at least one sector from the access terminal comprises receiving session information indicative of at least one sector selected from a pre-provisioned list of sectors stored in the access terminal.

5. The method of claim 2, wherein receiving the session information indicative of said at least one sector from the access terminal comprises receiving the session information indicative of said at least one sector in response to a user inputting the destination location to the access terminal.

6. The method of claim 1, wherein determining said at least one sector comprises converting the geographic locations into a list comprising a plurality of sectors associated with the route.

7. The method of claim 6, wherein the geographic information comprises geographic information generated by a navigation system based on the destination location input to the access terminal.

8. The method of claim 1, wherein determining said at least one sector comprises selecting at least one cell based on at least one distance between the current location and the destination location indicated by the geographic locations.

9. The method of claim 1, wherein determining said at least one sector comprises selecting said at least one sector from a plurality of sectors associated with said at least one selected cell based on at least one direction from the current location to the destination location.

10. The method of claim 1, wherein receiving the route update message comprises receiving a route update message including information indicative of a cell associated with the access terminal at the current location.

11. The method of claim 10, wherein receiving the route update message comprises receiving the route update message in response to the access terminal entering a cell that is not associated with said at least one sector or in response to the access terminal entering a cell that exceeds a threshold distance from a previous cell.

12. The method of claim 1, wherein paging the access terminal comprises providing at least one paging message from the base station router to said at least one sector.

13. A method, comprising:
receiving, at an access terminal, user input requesting computation of a route from a current location of the access terminal to a destination location;
accessing, at the access terminal, information indicative of the route from the current location to the destination location;
determining, at the access terminal, a travel pattern including at least one sector associated with the route; and
providing a route update message including session information indicating the travel pattern so that the access terminal can be paged in said at least one sector.

14. The method of claim 13, wherein providing the session information indicating the travel pattern comprises determining said at least one sector based on geographic locations along the route associated with the access terminal and providing information indicative of said at least one sector to a network entity.

15. The method of claim 14, wherein determining said at least one sector comprises selecting at least one cell based on at least one distance between the current location and one of the geographic locations along the route.

16. The method of claim 14, wherein determining said at least one sector comprises selecting said at least one sector from a plurality of sectors based on at least one direction from said at least one cell to at least one of the geographic locations.

17. The method of claim 16, comprising receiving information indicative of the plurality of sectors, and wherein determining said at least one sector comprises selecting said at least one sector from the provided plurality of sectors.

18. The method of claim 16, wherein determining said at least one sector comprises selecting said at least one sector from a pre-provisioned list of sectors stored in the access terminal.

19. The method of claim 14, wherein providing the information indicative of said at least one sector to the network entity comprises providing the information indicative of said at least one sector to a base station router, wherein the session information associated with the access terminal comprises the information indicative of said at least one sector, and wherein the session information can migrate between base station routers.

20. The method of claim 13, wherein providing the route update message comprises providing a route update message including information indicative of a cell of associated with the access terminal at the current location.

21. The method of claim 20, wherein providing the route update message comprises providing the route update message in response to the access terminal entering a cell that is not associated with said at least one sector or in response to the access terminal entering a cell that exceeds a threshold distance from a previous cell where the access terminal sent a last route update message.

22. The method of claim 13, comprising receiving at least one paging message while the access terminal is in one of said at least one sectors.

23. A method, comprising:
receiving, at a first base station router, at least one route update message including session information indicative of at least one travel pattern associated with at least one access terminal, the first base station router being a session control base station router for said at least one access terminal, said at least one travel pattern being determined based upon a current location of said at least one access terminal and a destination location, and wherein the travel pattern is determined in response to the destination location being input to the access terminal to request computation of the route;
storing the session information at the first base station router; and
paging said at least one access terminal in at least one sector associated with said at least one travel pattern.

24. The method of claim 23, comprising migrating the information indicative of said at least one travel pattern to a second base station router in response to said at least one access terminal selecting the second base station router as a new session control base station router for said at least one access terminal.

25. The method of claim 23, wherein storing the information indicative of said at least one travel pattern comprises storing information indicative of said at least one sector, said at least one sector being determined based on geographic locations along a route between the current location and the destination location, wherein the route is determined by a navigational system in response to the destination location being input to the access terminal.

26. The method of claim 25, wherein storing the information indicative of said at least one sector comprises receiving information indicative of said at least one sector from the access terminal, the access terminal being configured to access the geographic locations and to determine said at least one sector based on the accessed geographic locations.

27. The method of claim 23, comprising receiving a route update message including information indicative of a cell of associated with said at least one access terminal.

28. The method of claim 23, wherein paging said at least one access terminal comprises providing at least one paging message to at least one sector indicated in said at least one travel pattern.

\* \* \* \* \*